United States Patent
Satoh et al.

(10) Patent No.: US 11,370,401 B2
(45) Date of Patent: Jun. 28, 2022

(54) VEHICLE BRAKE SYSTEM

(71) Applicants: NISSIN KOGYO CO., LTD., Tomi (JP); VEONEER NISSIN BRAKE SYSTEMS JAPAN CO., LTD., Yokohama (JP); MITSUBISHI JIDOSHA KOGYO KABUSHIKI KAISHA, Tokyo (JP); NTN CORPORATION, Osaka (JP)

(72) Inventors: Hiromasa Satoh, Nagano (JP); Toshihiro Obika, Yokohama (JP); Yusuke Koga, Yokohama (JP); Hiromitsu Toyota, Tokyo (JP); Haruo Kotera, Tokyo (JP); Tatsuya Yamasaki, Iwata (JP); Yui Masuda, Iwata (JP)

(73) Assignees: MITSUBISHI JIDOSHA KOGYO KABUSHIKI KAISHA, Tokyo (JP); NTN CORPORATION, Osaka (JP); HITACHI ASTEMO, LTD., Nagano (JP); HITACHI ASTEMO UEDA CO., LTD., Nagano (JP)

( * ) Notice: Subject to any disclaimer, the term of this patent is extended or adjusted under 35 U.S.C. 154(b) by 50 days.

(21) Appl. No.: 16/499,063

(22) PCT Filed: Mar. 29, 2018

(86) PCT No.: PCT/JP2018/013434
§ 371 (c)(1),
(2) Date: Sep. 27, 2019

(87) PCT Pub. No.: WO2018/181806
PCT Pub. Date: Oct. 4, 2018

(65) Prior Publication Data
US 2020/0039484 A1 Feb. 6, 2020

(30) Foreign Application Priority Data

Mar. 31, 2017 (JP) .............................. JP2017-071351

(51) Int. Cl.
*B60T 8/17* (2006.01)
*B60T 13/74* (2006.01)
(Continued)

(52) U.S. Cl.
CPC ........ *B60T 8/17* (2013.01); *B60T 1/06* (2013.01); *B60T 13/74* (2013.01); *B60T 17/22* (2013.01)

(58) Field of Classification Search
CPC .......... B60T 13/74; B60T 13/741; B60T 8/17; B60T 7/042; B60T 8/176; B60T 17/22
See application file for complete search history.

(56) References Cited

U.S. PATENT DOCUMENTS 5,090,518 A * 2/1992 Schenk ..................... B60T 8/00
188/157
5,810,454 A * 9/1998 Prinzler ................ B60T 8/1755
188/158

(Continued)

FOREIGN PATENT DOCUMENTS

| JP | 2000-71960 A | 3/2000 |
| JP | 2001-138882 A | 5/2001 |

(Continued)

OTHER PUBLICATIONS

Extended European Search Report for European Application No. 18777200.9, dated Nov. 27, 2020.

(Continued)

*Primary Examiner* — Thomas J Williams
(74) *Attorney, Agent, or Firm* — Birch, Stewart, Kolasch & Birch, LLP (57) ABSTRACT

A highly reliable vehicle brake system including an electric brake is provided.

(Continued)

A vehicle brake system (1) includes electric brakes (16a to 16d) provided with motors (80 to 85), drivers (60 to 65) that drive the motors (80 to 85), and a control device that controls the drivers (60 to 65). The electric brake (16a) includes two motors (80 and 81), and the control device includes separate drivers (60 and 61) respectively corresponding to the two motors (80 and 81). The control device includes a first master controller (30) and a first sub-controller (40). The first master controller (30) controls the driver (61) corresponding to the motor (81), and the first sub-controller (40) controls the driver (60) corresponding to the motor 80.

7 Claims, 10 Drawing Sheets

(51) Int. Cl.
   *B60T 17/22* (2006.01)
   *B60T 1/06* (2006.01)

(56) References Cited

U.S. PATENT DOCUMENTS

| | | | |
|---|---|---|---|
| 6,040,665 A | 3/2000 | Shirai et al. | |
| 6,189,981 B1 * | 2/2001 | Niedermeier | B60T 7/042 303/122.04 |
| 6,476,515 B1 | 11/2002 | Yamamoto et al. | |
| 6,530,625 B2 * | 3/2003 | Arnold | B60T 8/00 303/126 |
| 6,969,127 B2 * | 11/2005 | Suzuki | B60T 13/741 303/122 |
| 8,814,279 B2 * | 8/2014 | Sekiya | B60T 8/3225 303/9.61 |
| 9,028,014 B2 * | 5/2015 | Clary | B60T 8/885 303/126 |
| 2005/0110339 A1 * | 5/2005 | Kolberg | B60T 13/74 303/20 |
| 2008/0054716 A1 * | 3/2008 | Sato | B60T 7/042 701/70 |
| 2008/0258548 A1 | 10/2008 | May et al. | |
| 2010/0274458 A1 * | 10/2010 | Cahill | B60T 17/221 701/76 |
| 2014/0100719 A1 * | 4/2014 | Thibault | B60T 8/1703 701/3 |
| 2017/0240148 A1 * | 8/2017 | Kotera | F16D 65/18 |
| 2018/0134264 A1 * | 5/2018 | Masuda | B60T 13/74 |
| 2020/0031322 A1 * | 1/2020 | Satoh | B60T 13/74 |
| 2020/0031323 A1 * | 1/2020 | Satoh | B60T 13/74 |
| 2020/0039485 A1 * | 2/2020 | Satoh | B60T 8/17 |
| 2020/0070788 A1 * | 3/2020 | Michels | B60T 13/66 |
| 2020/0223409 A1 * | 7/2020 | Satoh | B60T 7/042 |

FOREIGN PATENT DOCUMENTS

| | | |
|---|---|---|
| JP | 2010-149587 A | 7/2010 |
| JP | 2013-132166 A | 7/2013 |
| JP | 2013-203275 A | 10/2013 |
| JP | 2014-76797 A | 5/2014 |
| WO | WO 2007/120267 A2 | 10/2007 |

OTHER PUBLICATIONS

International Search Report for International Application No. PCT/JP2018/013434, dated May 29, 2018.

Chinese Office Action and Search Report for Chinese Application No. 201880021720.2 dated Apr. 16, 2021, with English translation.

English Machine Translation of JP-2013-132166-A, dated Jul. 4, 2013.

English Machine Translation of JP-2013-203275-A, dated Oct. 7, 2013.

Japanese Office Action for Japanese Application No. JP 2019-510180 dated Aug. 10, 2021 with English Translation.

Japanese Office Action for Application No. JP 2019-510180 dated Jan. 18, 2022 with English translation.

Chinese Office Action and Search Report for corresponding Chinese Application No. 201880021720.2, dated Dec. 3, 2021, with English translation.

* cited by examiner

VEHICLE BRAKE SYSTEM

TECHNICAL FIELD

The present invention relates to a highly reliable vehicle brake system provided with an electric brake.

BACKGROUND ART

For a vehicle brake system, there has been suggested an electric brake system in which a multiplicity of control devices and a multiplicity of microcomputers are installed (PTL 1). In the above system, control devices and microcomputers of the brake system are multiplexed to make the system redundant. However, redundancy has not yet been achieved with respect to the electric motor and motor driver of the brake caliper.

CITATION LIST

Patent Literature

PTL: JP-A-2001-138882

SUMMARY OF INVENTION

Technical Problem

An object of the invention is to provide a vehicle brake system provided with an electric brake, which is a vehicle brake system with high reliability.

Solution to Problem

The invention has been made to achieve at least part of the above object, and can be achieved as the following embodiments or the application examples.

<1>

According to one embodiment of the invention, there is provided a vehicle brake system including:
an electric brake including at least one unit of an electric actuator that presses a friction pad toward a rotor side,
a driver that drives the electric actuator, and
a control device that controls the driver,
the electric brake including a plurality of electric actuators, and
the driver individually corresponding to a unit of the plurality of electric actuators.

According to one embodiment of the above vehicle brake system, the electric brake is provided with a plurality of electric actuators, and the driver individually correspond to a unit of the plurality of electric actuators to achieve redundancy of the electric brake. Further, in the electric brake, the electric actuators can be individually controlled to perform various controls in accordance with situations, to thus improve the controllability.

<2>

In one embodiment of the above vehicle brake system,
the electric brake may include two units of the electric actuators,
the control device may include a first controller and a second controller,
the first controller may control the driver corresponding to one of the two units of the electric actuators, and the second controller may control the driver corresponding to another of the two units of the electric actuators.

According to one embodiment of the above vehicle brake system, the first controller that controls a driver corresponding to one of the two units of the electric actuators and the second controller that controls a driver corresponding to another of the two units of the electric actuators are provided to improve redundancy of the system. Further, the first controller and the second controller can individually control the two units of the electric actuators to improve the controllability.

<3>

In one embodiment of the above the vehicle brake system,
the control device may include a first control device and a second control device,
the first control device may include the first controller, and
the second control device may include the second controller.

According to one embodiment of the above vehicle brake system, the first control device including the first controller and the second control device including the second controller are provided to improve redundancy of the system. Further, the first control device and the second control device can individually control the two units of the electric actuators to improve the controllability.

<4>

In one embodiment of the above vehicle brake system,
output signals from the plurality of electric actuators may be input into the first controller and the second controller.

According to one embodiment of the above the vehicle brake system, redundancy of the electric brake can be achieved with a simple configuration.

<5>

In one embodiment of the above vehicle brake system,
the electric brake including the plurality of electric actuators may be provided to a front wheel.

According to one embodiment of the above vehicle brake system, redundancy of the electric brake at the front wheel can be achieved to enhance the reliability.

DESCRIPTION OF EMBODIMENTS

Preferred embodiments of the invention will be described below in detail with reference to the drawings. The drawings used in the description are provided for convenience of explanation. Note that the embodiments described below do not unduly limit the contents of the invention described in the claims. Moreover, all of the elements described below are not necessarily essential requirements of the invention.

A vehicle brake system according to an embodiment of the invention includes an electric brake including at least one unit of an electric actuator that presses a friction pad toward a rotor side, a driver that drives the electric actuator, and a control device that controls the driver. The electric brake includes a plurality of electric actuators, and the driver individually correspond to a unit of the plurality of electric actuators.

1. Vehicle Brake System

Figure 1:
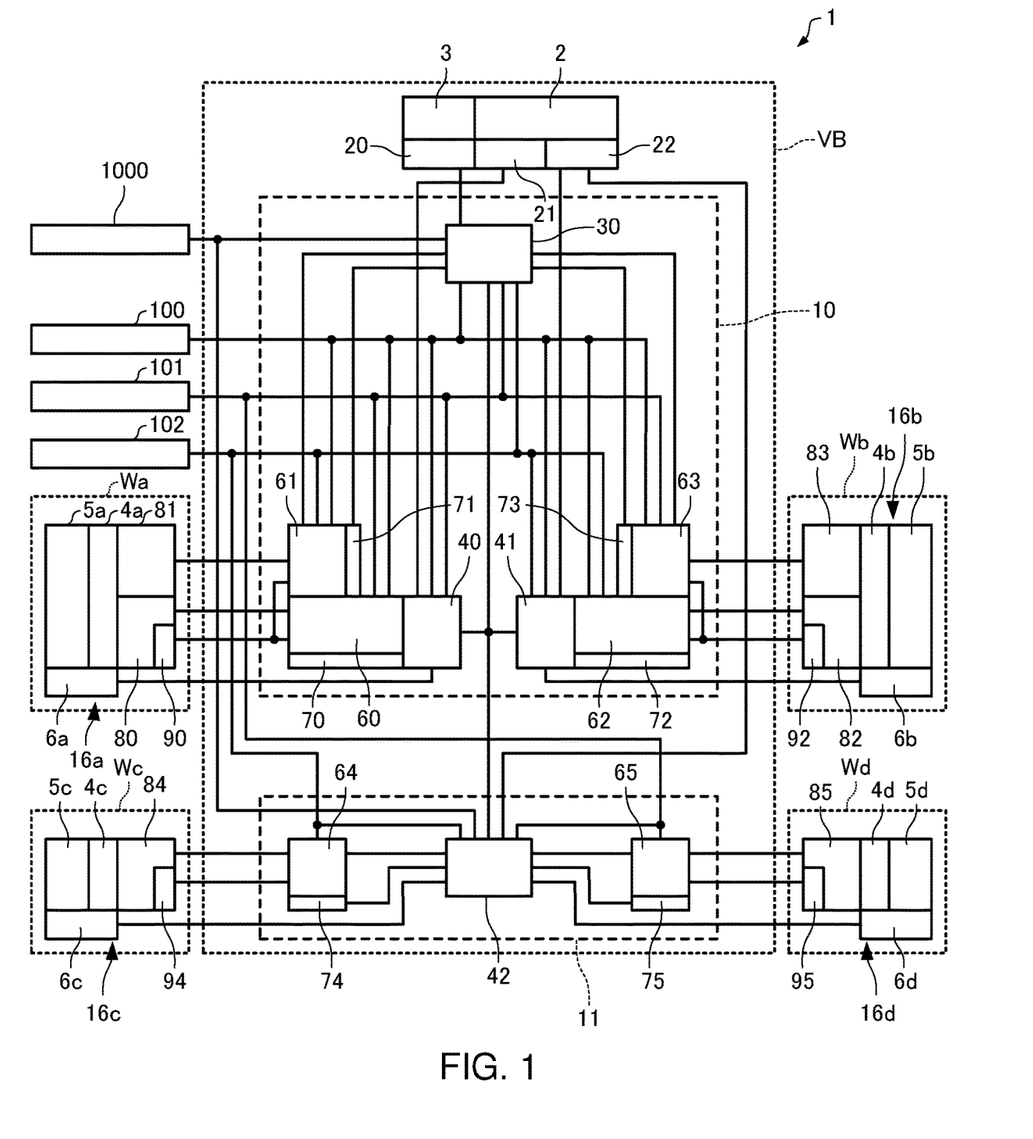
FIG. 1 is an overall configuration diagram illustrating a vehicle brake system according to an embodiment of the invention.
Figure 2:
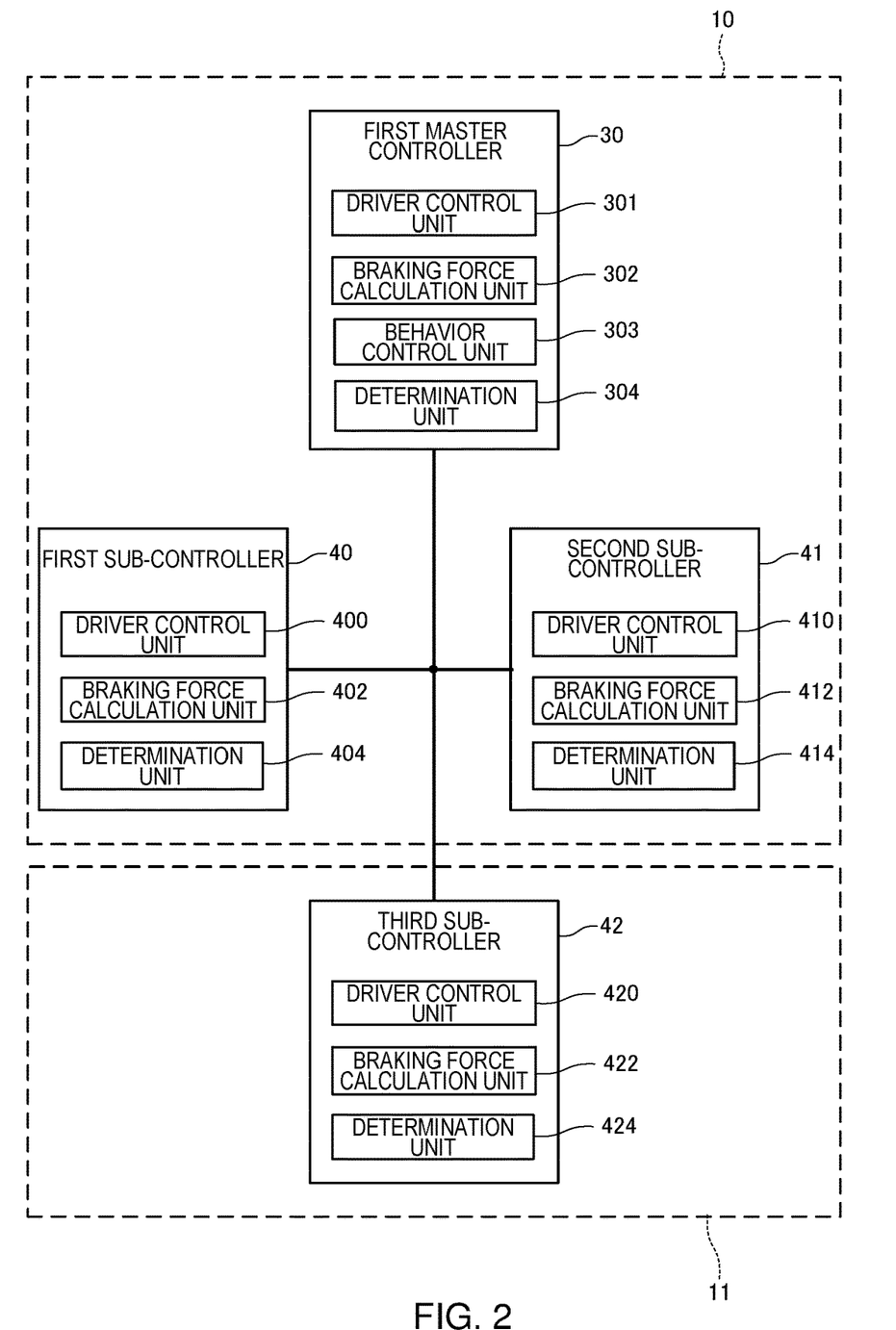
FIG. 2 is a block diagram illustrating a first master controller and first to third sub-controllers of a vehicle brake system according to an embodiment of the invention.

A vehicle brake system 1 according to an embodiment of the invention will be described in detail with reference to FIGS. 1 and 2. FIG. 1 is an overall configuration diagram illustrating the vehicle brake system 1 according to the embodiment. FIG. 2 is a block diagram illustrating a first master controller 30 and first to third sub-controllers 40 to 42 of the vehicle brake system 1 according to the embodiment.

As illustrated in FIG. 1, the vehicle brake system 1 includes electric brakes 16a to 16d including at least one unit of motors 80 to 85 being an electric actuator that presses a non-illustrated friction pad toward a non-illustrated rotor side, drivers 60 to 65 that drive the motors 80 to 85, and control devices (10 and 11) including a plurality of controllers (the first master controller 30, the first sub-controller 40, the second sub-controller 41 and the third sub-controller 42) connected to one another. The non-illustrated rotors, which are provided to the wheels Wa to Wd of a vehicle VB being a four-wheeled vehicle, rotate integrally with the wheels Wa to Wd. Note that the vehicle VB is not limited to a four-wheeled vehicle. Further, a plurality of motors may be provided to one electric brake, or a plurality of electric brakes may be provided to one wheel.

1-1. Electric Brake

The electric brake 16a provided to the wheel Wa at the front-wheel left-side (FL) includes a brake caliper 5a, motors 80 and 81 fixed to the brake caliper 5a via a decelerator 4a, and a load sensor 6a that detects a load applied from the motors 80 and 81 to the non-illustrated friction pads. The motor 80 includes a rotation angle sensor 90 that detects the relative position of the rotation axis with respect to the stator of its own. The motor 81, which is coaxial with the motor 80, does not need a rotation angle sensor (shares the rotation angle sensor 90 with the motor 80). The detection signal from the load sensor 6a is input into the first sub-controller 40, and a detection signal from the rotation angle sensor 90 (output signals from the plurality of electric actuators) is input into the first sub-controller 40 and the first master controller 30 via the drivers 60 and 61.

The electric brake 16b provided to the wheel Wb at the front-wheel right-side (FR) includes a brake caliper 5b, motors 82 and 83 fixed to the brake caliper 5b via a decelerator 4b, and a load sensor 6b that detects a load applied from the motors 82 and 83 to the non-illustrated friction pads. The motor 82 includes a rotation angle sensor 92 that detects the relative position of the rotation axis with respect to the stator of its own. The motor 83, which is coaxial with the motor 82, does not need a rotation angle sensor (shares the rotation angle sensor 92 with the motor 82). The detection signal from the load sensor 6b is input into the second sub-controller 41 and a detection signal (output signal from the plurality of electric actuators) from the rotation angle sensor 92 is input into the second sub-controller 41 and the first master controller 30 via the drivers 62 and 63.

The electric brake 16c provided to the wheel Wc at the rear-wheel left-side (RL) includes a brake caliper 5c, a motor 84 fixed to the brake caliper 5c via a decelerator 4c, and a load sensor 6c that detects a load applied from the motor 84 to the non-illustrated friction pads. The motor 84 includes a rotation angle sensor 94 that detects the relative position of the rotation axis with respect to the stator of its own. The detection signal from the load sensor 6c is input into the third sub-controller 42, and the detection signal from the rotation angle sensor 94 is input into the third sub-controller 42 via the driver 64.

The electric brake 16d provided to the wheel Wd at the rear-wheel right-side (RR) includes a brake caliper 5d, a motor 85 fixed to the brake caliper 5d via a decelerator 4d, and a load sensor 6d that detects a load applied from the motor 85 to the non-illustrated friction pads. The motor 85 includes a rotation angle sensor 95 that detects the relative position of the rotation axis with respect to the stator of its own. The detection signal from the load sensor 6d is input into the third sub-controller 42, and the detection signal from the rotation angle sensor 95 is input into the third sub-controller 42 via the driver 65.

The brake calipers 5a to 5d are formed in a substantially C-shape, and are integrally provided with a claw portion extending to the opposite side across a non-illustrated rotor.

The decelerators 4a to 4d, which is fixed to the brake calipers 5a to 5d, transmit torque generated by the rotation of the motors 80 to 85 to non-illustrated linear motion mechanisms that are built into the brake calipers 5a to 5d.

The linear motion mechanism can employ a publicly known mechanism in the electric brake. The linear motion mechanism converts the rotation of the motors 80 to 85 into a linear motion of the friction pads via the decelerators 4a to 4d. The linear motion mechanism presses the friction pads against the rotor to suppress the rotation of the wheels Wa to Wd.

The motors 80 to 85 can employ a publicly known electric motor, which is, for example, a brushless DC motor. Driving of the motor 80 to 85 causes the friction pads to move via the decelerators 4a to 4d and the linear motion mechanisms. An example will be described in which a motor is employed as the electric actuator, however, other publicly known actuators may be employed without being limited thereto.

1-2. Input Device

The vehicle brake system 1 includes a brake pedal 2 being an input device, and a stroke simulator 3 connected to the brake pedal 2. The brake pedal 2 includes a second stroke sensor 21 and a third stroke sensor 22 that detect the operation amount of the brake pedal 2 of the driver. The stroke simulator 3 includes a first stroke sensor 20 that detects the operation amount of the brake pedal 2.

Each of the stroke sensors 20 to 22 mutually independently generates an electrical detection signal corresponding to a depression stroke and/or a depression force being a kind of the operation amount of the brake pedal 2. The first stroke sensor 20 sends the detection signal to the first master controller 30 to be described below. The second stroke sensor 21 sends the detection signal to the first sub-controller 40 to be described below. The third stroke sensor 22 sends the detection signal to the second sub-controller 41 and the third sub-controller 42 to be described below.

The vehicle VB includes, as an input device to the vehicle brake system 1, a plurality of control devices (hereinafter referred to as "other control devices 1000") provided in systems other than the vehicle brake system 1. The other control devices 1000 are connected by Controller Area Network (CAN) to the first master controller 30 of the first control device 10 and to the third sub-controller 42 of the second control device 11 to communicate information about brake operation to each other.

1-3. Control Device

A control device includes the first control device 10 and the second control device 11. The first control device 10 is disposed at a predetermined position on the vehicle VB independently from the second control device 11. The first control device 10 and the second control device 11 are electronic control units (ECUs). Each of the first control device 10 and the second control device 11 is housed in a synthetic resin chassis. Accordingly, redundancy is achieved by the two control devices, which are the first control device 10 and the second control device 11. Note that an example is described in which two control devices are used, but one control device may be used in view of the disposition in the vehicle VB, or three or more may be used to further enhance redundancy.

The first control device 10 and the second control device 11 are connected via CAN, whereby communication is performed. The communication via CAN performs unidirectional and bidirectional information transmissions. Note that communication between ECU is not limited to CAN.

The first control device 10 and the second control device 11 are electrically connected to three batteries 100, 101, and 102 that are independent from one another. The batteries 100, 101, and 102 supplies electric power to electronic components included in the first control device 10 and the second control device 11. The batteries 100, 101, and 102 of the vehicle brake system 1 are arranged in predetermined positions in the vehicle VB.

The first control device 10 includes the first master controller 30, the first sub-controller 40, the second sub-controller 41, and the drivers 60 to 63. The second control device 11 includes the third sub-controller 42 and drivers 64 and 65. The first master controller 30 and the first to third sub-controllers 40 to 42 are microcomputers. The first control device 10 is mounted with the plurality of controllers to improve redundancy and reliability in the first control device 10. The first control device 10 can also achieve cost reduction by not being mounted with a plurality of master controllers, which are relatively expensive. The first master controller 30 needs high performance to provide a behavior control unit 303 (the behavior control unit 303 will be described below), and this causes the first master controller 30 to become a relatively expensive controller compared to the first to third sub-controllers 40 to 42.

As illustrated in FIGS. 1 and 2, the first master controller 30 includes a driver control unit 301 that controls the drivers 61 and 63, a braking force calculation unit 302 that calculates braking force of the electric brakes 16a to 16d, and a behavior control unit 303 that controls behaviors of the vehicle VB.

The first sub-controller 40 includes a driver control unit 400 that controls the driver 60, and a braking force calculation unit 402 that calculates braking force of the electric brakes 16a to 16d. The second sub-controller 41 includes a driver control unit 410 that controls the driver 62, and a braking force calculation unit 412 that calculates braking force of the electric brakes 16a to 16d. The third sub-controller 42 includes a driver control unit 420 that controls the drivers 64 and 65, and a braking force calculation unit 422 that calculates braking force of the electric brakes 16a to 16d. The first to third sub-controllers 40 to 42, due to the lack of the behavior control unit, can employ a microcomputer that is less expensive than the first master controller 30, thus contributing to a cost reduction.

The drivers 60 to 65 control the drives of the motors 80 to 85. Specifically, the driver 60 controls the drive of the motor 80, the driver 61 controls the drive of the motor 81, the driver 62 controls the drive of the motor 82, the driver 63 controls the drive of the motor 83, the driver 64 controls the drive of the motor 84, and the driver 65 controls the drive of the motor 85. The drivers 60 to 65 control the motors 80 to 85 by sinusoidal drive scheme, for example. The drivers 60 to 65 may also control, for example, by square-wave current, without being limited to sinusoidal drive scheme.

The drivers 60 to 65 include a power supply circuit and an inverter that supply electric power being commensurate with the commands from the driver control units 301, 400, 410, and 420 to the motors 80 to 85.

The braking force calculation units 302, 402, 412, and 422 calculate braking force (a required value) based on a detection signal from each of the stroke sensors 20 to 22, which is commensurate with the operation amount of the brake pedal 2. The braking force calculation units 302, 402, 412, and 422 can also calculate braking force (a required value) based on a signal from other control devices 1000.

The driver control units 301, 400, 410, and 420 control the drivers 60 to 65 based on the braking forces (the required values) calculated by the braking force calculation units 302, 402, 412, and 422, detection signals from the load sensors 6a to 6d, and detection signals from the rotation angle sensors 90, 92, 94, and 95. The drivers 60 to 65 supply driving sinusoidal currents to the motors 80 to 85 in accordance with commands from the driver control units 301, 400, 410, and 420. The currents supplied to the motors 80 to 85 are detected by current sensors 70 to 75.

The behavior control unit 303 outputs signals for controlling behaviors of the vehicle VB to the driver control units 301, 400, 410, and 420. The above behaviors are other than simple braking behaviors in response to the operation of the brake pedal 2 of normal, that are, for example, Antilock Brake System (ABS), which is a control for preventing locking of the wheels Wa to Wd, Traction Control System (TCS), which is a control for suppressing slippage of the wheels Wa to Wd, and a behavior stabilization control, which is a control for suppressing sideslip of the vehicle VB.

The first master controller 30 and the first to third sub-controllers 40 to 42 include determination units 304, 404, 414, and 424 that compare the braking force calculation results of the other controllers to determine braking force. The first master controller 30 and the first to third sub-controllers 40 to 42, which include the determination units 304, 404, 414, and 424, separately use the controllers (30, 40, 41, and 42) in accordance with the braking force calculation results, to thus achieve redundancy of the vehicle brake system 1.

The determination units 304, 404, 414, and 424 compare the braking force calculation results of the other controllers to determine braking force. The other controllers are the first sub-controller 40, the second sub-controller 41, and the third sub-controller 42 for the determination unit 304, the first master controller 30, the second sub-controller 41, and the third sub-controller 42 for the determination unit 404, the first master controller 30, the first sub-controller 40, and the third sub-controller 42 for the determination unit 414, and the first master controller 30, the first sub-controller 40, and the second sub-controller 41 for the determination unit 424. For example, the determination units 304, 404, 414, and 424 compare the calculation result of the braking force calculation unit 302 of the first master controller 30, the calculation result of the braking force calculation unit 402 of the first sub-controller 40, the calculation result of the braking force calculation unit 412 of the second sub-controller 41, and the calculation result of the braking force calculation unit 422 of the third sub-controller 42 to determine, by majority decision, which calculation result will be used as the braking force. For example, if the calculation result of the braking force calculation unit 402 is solely different from the other calculation results, the first master controller 30 controls the driver 61 and the driver 63 based on the braking force calculation results of the braking force calculation unit 302, the braking force calculation unit 412, and the braking force calculation unit 422. That is, the determination units 304, 404, 414, and 424 make the vehicle brake system 1 redundant.

In the vehicle brake system 1 according to the embodiment, the electric brake 16a provided to the wheel Wa (at the left-side front-wheel) includes two motors 80 and 81, the electric brake 16b provided to the wheel Wb (at the right-side front-wheel) includes two motors 82 and 83, the drivers 60 and 61 respectively corresponding to two motors 80 and 81 and the drivers 62 and 63 respectively corresponding to two motors 82 and 83 are included, and the first master controller 30 (first controller) that controls the drivers 61 and 63 (the driver corresponding to one of the two motors), and the first and second sub-controllers 40 and 41 (second controllers) that control the drivers 60 and 62 (the driver corresponding to the other of the two motors) are included. This configuration achieves redundancy of the electric brake of the front wheel (each of a motor provided to the electric brake, the driver that drives the motor, and the controller that controls the driver), to thus enhance the reliability. Even if one of the drivers 60 and 61 has a breakdown, one of the motors 80 and 81 can be driven by the other, and even if one of the drivers 62 and 63 has a breakdown, one of the motors 82 and 83 can be driven by the other, thus improving redundancy and reliability of the electric brake of the front wheel. Further, the first master controller 30 (first controller) and the first sub-controller 40 (second controller) can individually control the two motors 80 and 81 of the electric brake 16a, and the first master controller 30 (first controller) and the second sub-controller 41 (second controller) can individually control the two motors 82 and 83 of the electric brake 16b to improve the controllability.

2. Modified Example 1

Figure 3:
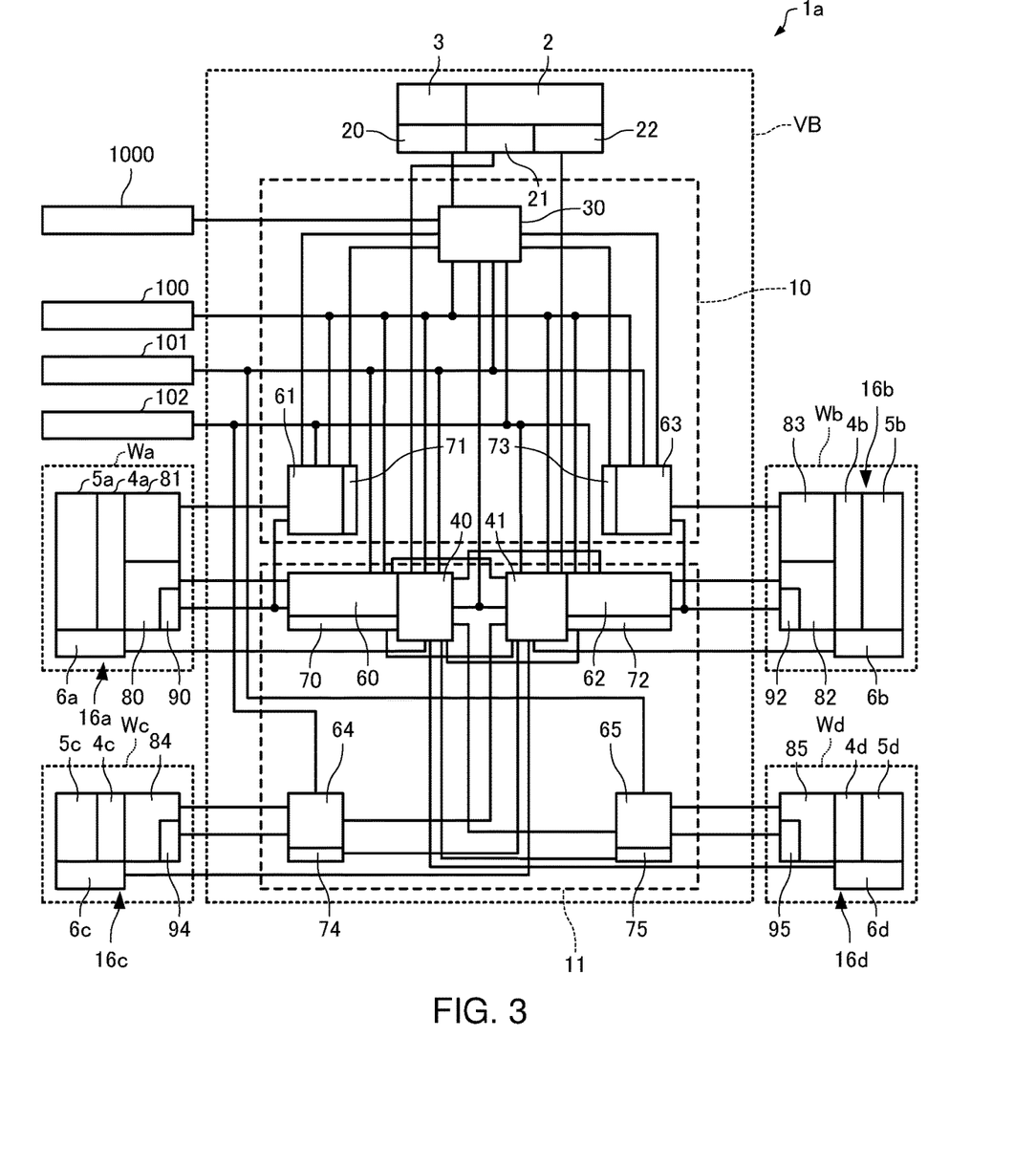
FIG. 3 is an overall configuration diagram illustrating a vehicle brake system according to Modified Example 1.
Figure 4:
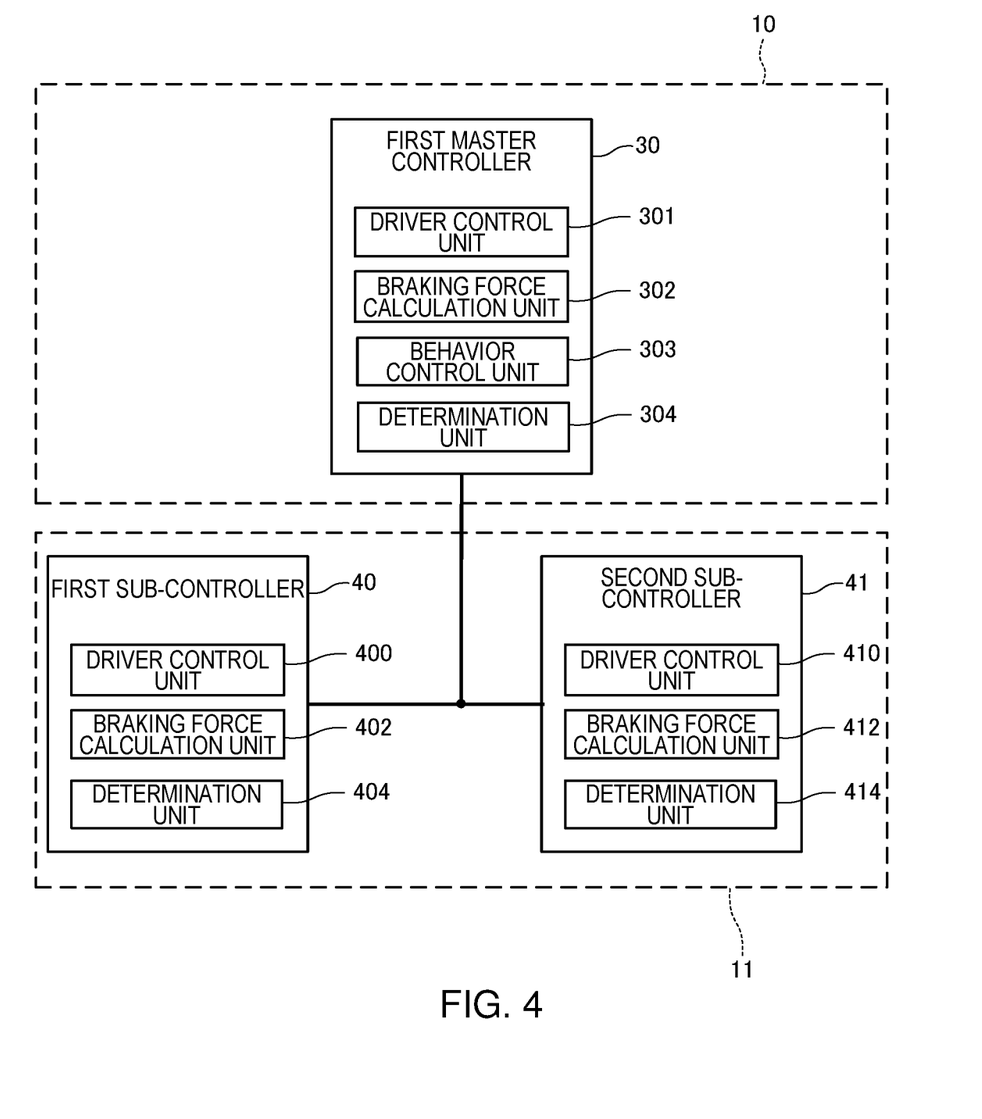
FIG. 4 is a block diagram illustrating a first master controller and first and second sub-controllers of a vehicle brake system according to Modified Example 1.

A vehicle brake system 1a according to Modified Example 1 will be described with reference to FIGS. 3 and 4. FIG. 3 is an overall configuration diagram illustrating the vehicle brake system 1a according to Modified Example 1. FIG. 4 is a block diagram illustrating the first master controller 30 and the first and second sub-controllers 40 and 41 of the vehicle brake system 1a according to Modified Example 1. In the following descriptions, the same components as in the vehicle brake system 1 of FIGS. 1 and 2 are denoted by the same reference signs in FIGS. 3 and 4, and detailed descriptions thereof will be omitted.

As illustrated in FIGS. 3 and 4, in the vehicle brake system 1a, a control device includes a first control device 10 and a second control device 11.

The first control device 10 includes a first master controller 30, a driver 61 that drives the motor 81 of the electric brake 16a, a driver 63 that drives the motor 83 of the electric brake 16b, and current sensors 71 and 73.

The second control device 11 includes a first sub-controller 40, a second sub-controller 41, a driver 60 that drives the motor 80 of the electric brake 16a, a driver 62 that drives the motor 82 of the electric brake 16b, a driver 64 that drives the motor 84 of the electric brake 16c, a driver 65 that drives the motor 85 of the electric brake 16d, and current sensors 70, 72, 74, and 75.

The driver control unit 301 of the first master controller 30 controls the drivers 61 and 63. The driver control unit 400 of the first sub-controller 40 controls the drivers 60, 62, and 65. The driver control unit 410 of the second sub-controller 41 controls the drivers 60, 62, and 64. Note that the detection signal from the load sensor 6c is input into the second sub-controller 41, and the detection signal from the rotation angle sensor 94 is input into the second sub-controller 41 via the driver 64. The detection signal from the load sensor 6d is input into the first sub-controller 40, and the detection signal from the rotation angle sensor 95 is input into the first sub-controller 40 via the driver 65.

According to the vehicle brake system 1a of Modified Example 1, the first control device 10 including the first master controller 30 (first controller) and the drivers 61 and 63 corresponding to the motors 81 and 83 (drivers corresponding to one of the two motors), and the second control device 11 including the second sub-controllers 40 and 41 (second controllers) and the drivers 60 and 62 corresponding to the motors 80 and 82 (drivers corresponding to the other of the two motors) are provided to improve redundancy of the vehicle brake system 1a. Further, the first control device 10 and the second control device 11 can individually control the two motors 80 and 81 of the electric brake 16a and the two motors 82 and 83 of the electric brake 16b to improve the controllability.

3. Modified Example 2

Figure 5:
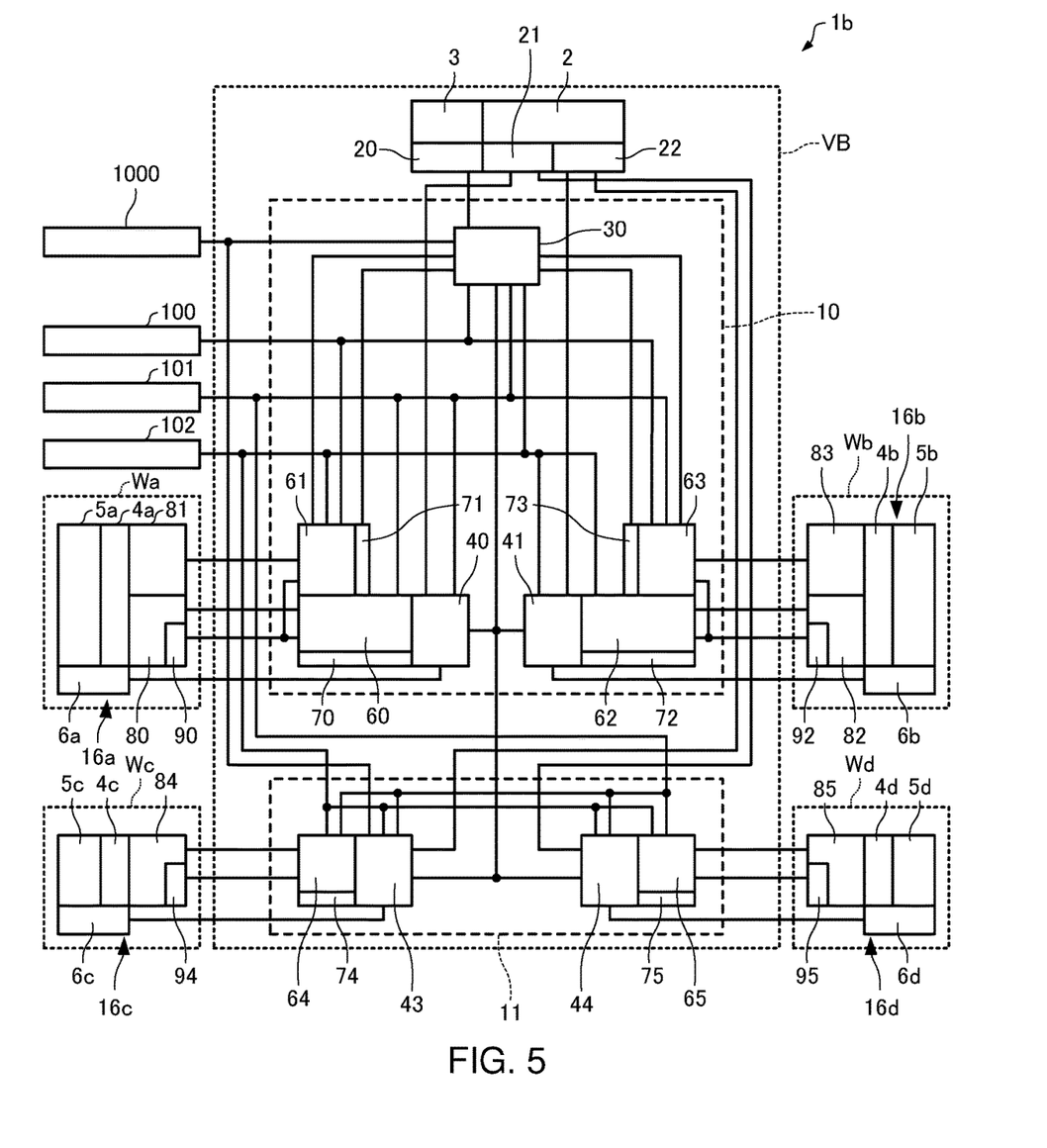
FIG. 5 is an overall configuration diagram illustrating a vehicle brake system according to Modified Example 2.
Figure 6:
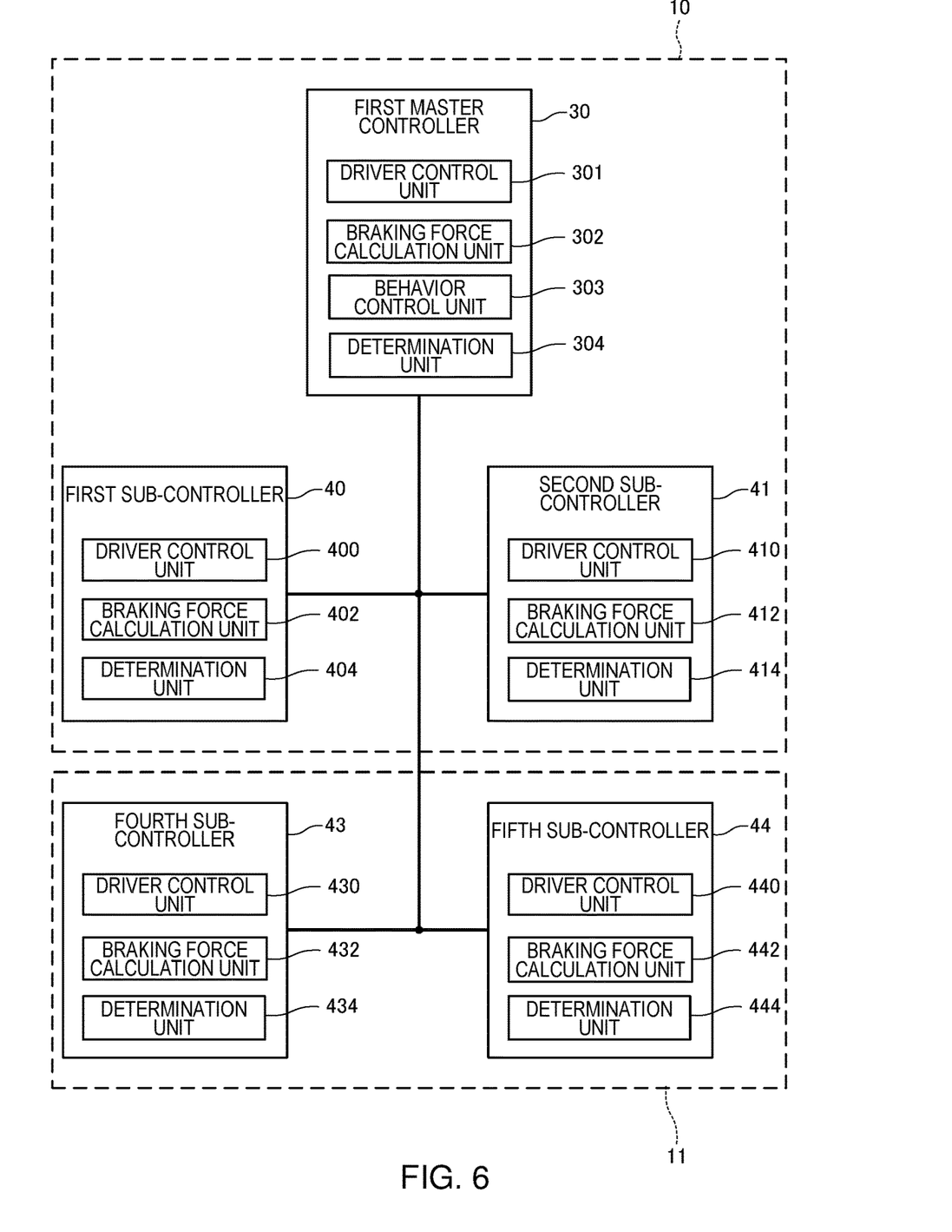
FIG. 6 is a block diagram illustrating a first master controller and first, second, fourth, and fifth sub-controllers of a vehicle brake system according to Modified Example 2.

A vehicle brake system 1b according to Modified Example 2 will be described with reference to FIGS. 5 and 6. FIG. 5 is an overall configuration diagram illustrating the vehicle brake system 1b according to Modified Example 2. FIG. 6 is a block diagram illustrating a first master controller 30 and first, second, fourth, and fifth sub-controllers 40, 41, 43, and 44 of the vehicle brake system 1b according to Modified Example 2. In the following descriptions, the same components as in the vehicle brake system 1 of FIGS. 1 and 2 are denoted by the same reference signs in FIGS. 5 and 6, and detailed descriptions thereof will be omitted.

As illustrated in FIGS. 5 and 6, in the vehicle brake system 1b, a control device includes a first control device 10 and a second control device 11.

The first control device 10 includes the first master controller 30, the first sub-controller 40, the second sub-controller 41, drivers 60 and 61 that drive the motors 80 and 81 of the electric brake 16a, drivers 62 and 63 that drive the motors 82 and 83 of the electric brake 16b, and current sensors 70 to 73.

The second control device 11 includes the fourth sub-controller 43, the fifth sub-controller 44, a driver 64 that drives the motor 84 of the electric brake 16c, a driver 65 that drives the motor 85 of the electric brake 16d, and current sensors 74 and 75.

A driver control unit 301 of the first master controller 30 controls the drivers 61 and 63. A driver control unit 400 of the first sub-controller 40 controls the driver 60. The driver control unit 410 of the second sub-controller 41 controls the driver 62.

The fourth and fifth sub-controllers 43 and 44 are microcomputers. The fourth sub-controller 43 includes a driver control unit 430, a braking force calculation unit 432, and a determination unit 434 that are similarly configured as in the first sub-controller 40. The fifth sub-controller 44 includes a driver control unit 440, a braking force calculation unit 442, and a determination unit 444 that are similarly configured as in the first sub-controller 40. The driver control unit 430 controls the driver 64 and the driver control unit 440 controls the driver 65. Note that the detection signal from the load sensor 6c is input into the fourth sub-controller 43, and the detection signal from the rotation angle sensor 94 is input into the fourth sub-controller 43 via the driver 64. The detection signal from the load sensor 6d is input into the fifth sub-controller 44, and the detection signal from the rotation angle sensor 95 is input into the fifth sub-controller 44 via the driver 65. Further, the detection signal from the second stroke sensor 21 is input into the fifth sub-controller 44 in addition to the first sub-controller 40. The detection signal from the third stroke sensor 22 is input into the fourth sub-controller 43 in addition to the second sub-controller 41.

The vehicle brake system 1b according to Modified Example 2, as in the vehicle brake system 1, achieves redundancy of the electric brake of the front wheel, and improves the controllability.

4. Modified Example 3

Figure 7:
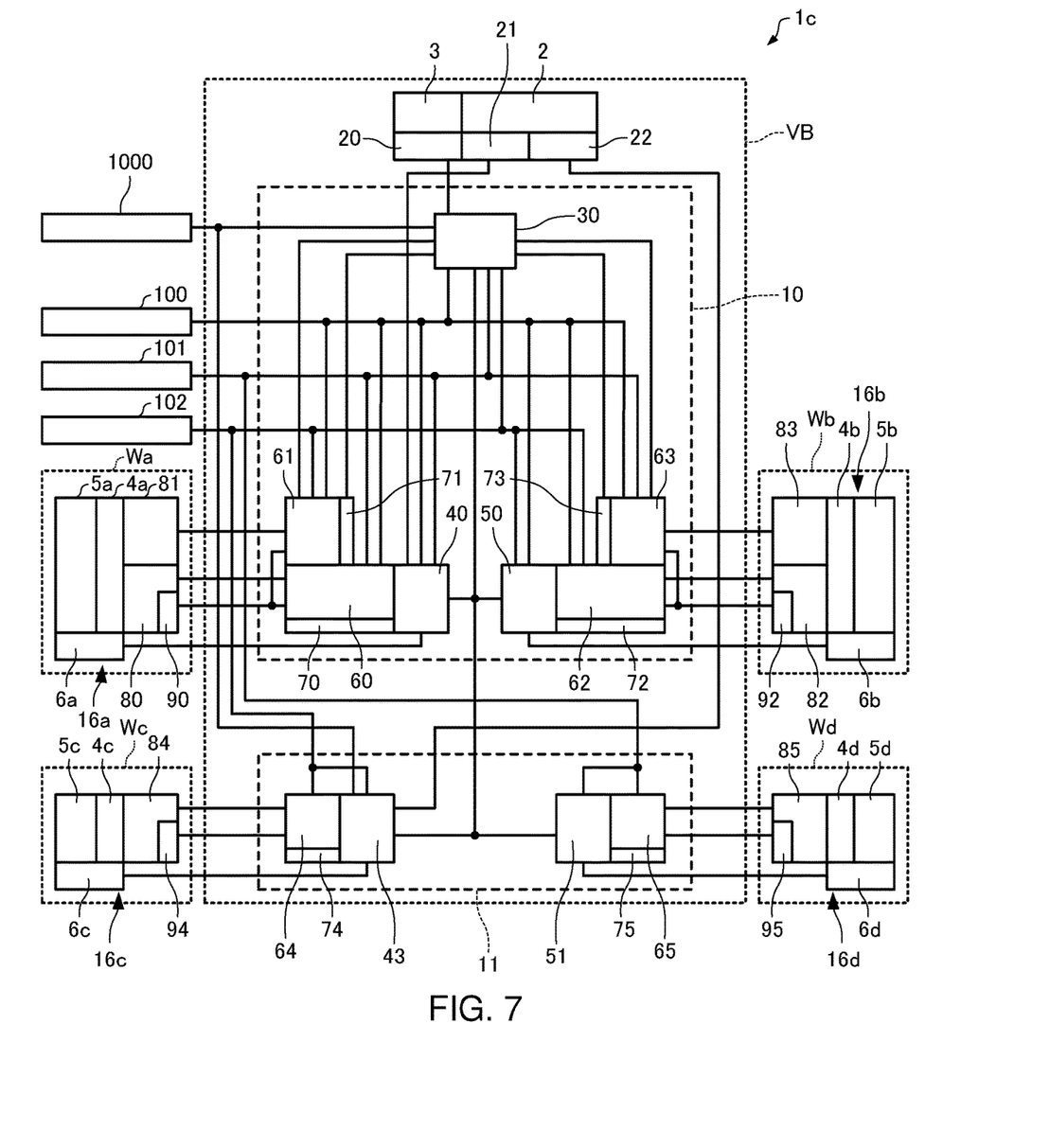
FIG. 7 is an overall configuration diagram illustrating a vehicle brake system according to Modified Example 3.
Figure 8:
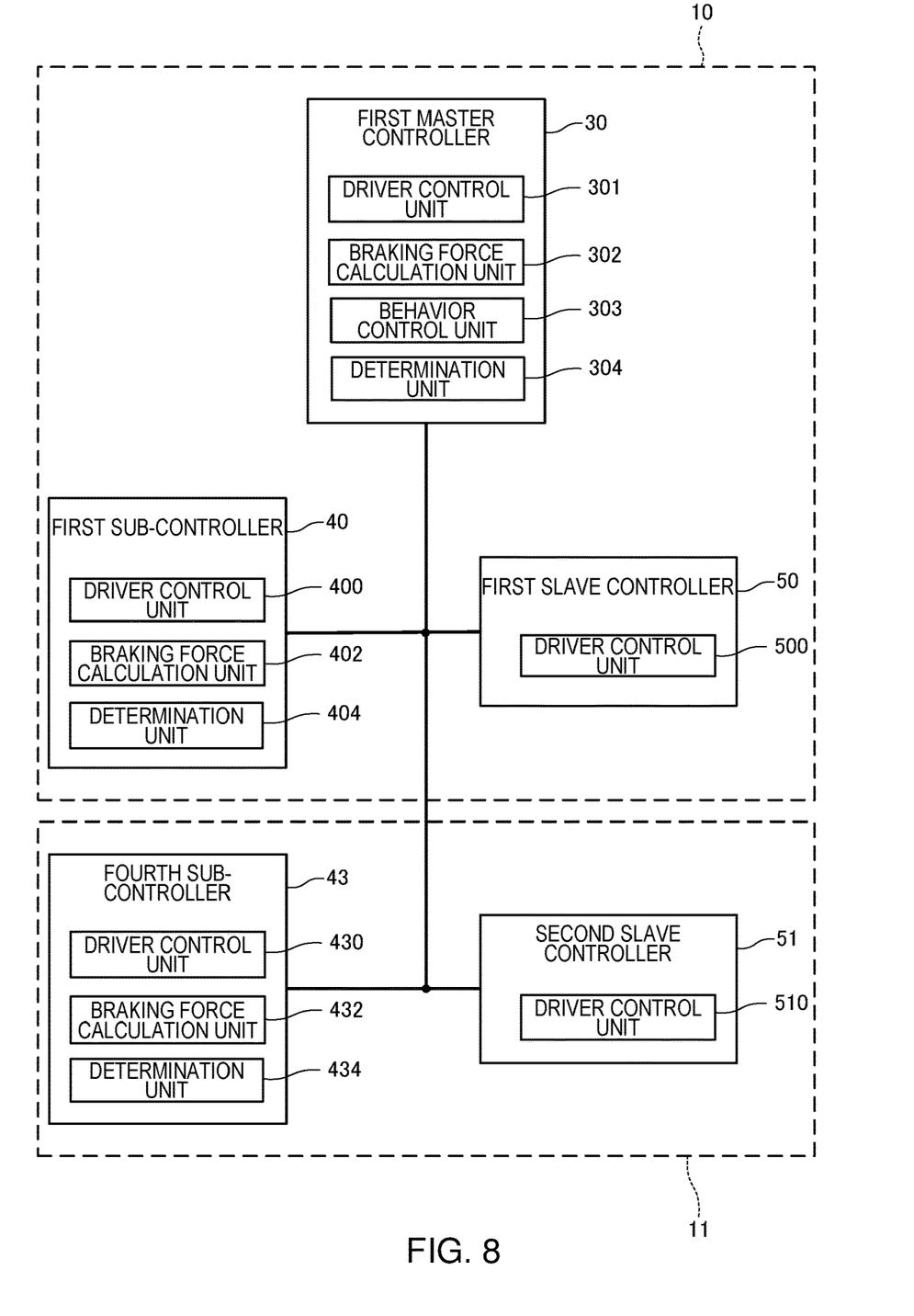
FIG. 8 is a block diagram illustrating a first master controller, first and fourth sub-controllers, and first and second slave controllers of a vehicle brake system according to Modified Example 3.

A vehicle brake system 1c according to Modified Example 3 will be described with reference to FIGS. 7 and 8. FIG. 7 is an overall configuration diagram illustrating the vehicle brake system 1c according to Modified Example 3. FIG. 8 is a block diagram illustrating a first master controller 30, first and fourth sub-controllers 40 and 43, and first and second slave controllers 50 and 51 of the vehicle brake system 1c according to Modified Example 3. In the following descriptions, the same components as in the vehicle brake systems 1 and 1b of FIGS. 1, 2, 5, and 6 are denoted by the same reference signs in FIGS. 7 and 8, and detailed descriptions thereof will be omitted.

As illustrated in FIGS. 7 and 8, in the vehicle brake system 1c, a control device includes a first control device 10 and a second control device 11.

The first control device 10 includes the first master controller 30, the first sub-controller 40, the first slave controller 50, drivers 60 and 61 that drive the motors 80 and 81 of the electric brake 16a, drivers 62 and 63 that drive the motors 82 and 83 of the electric brake 16b, and current sensors 70 to 73. That is, the first slave controller 50 is provided in place of the second sub-controller 41 of the vehicle brake system 1b in FIG. 5.

The second control device 11 includes the fourth sub-controller 43, the second slave controller 51, a driver 64 that drives the motor 84 of the electric brake 16c, a driver 65 that drives the motor 85 of the electric brake 16d, and current sensors 74 and 75. That is, the second slave controller 51 is provided in place of the fifth sub-controller 44 of the vehicle brake system 1b in FIG. 5.

The first and second slave controllers 50 and 51 are microcomputers and include driver control units (500 and 510) that control the driver based on the braking force calculation results of braking force calculation units of the first master controller 30 and the first and fourth sub-controllers 40 and 43. The first and second slave controllers 50 and 51, which do not include a braking force calculation unit, can employ a relatively inexpensive microcomputer compared to the first and fourth sub-controllers 40 and 43, thus contributing to a cost reduction. The driver control unit 500 of the first slave controller 50 controls the driver 62, and the driver control unit 510 of the second slave controller 51 controls the driver 65. Note that the detection signal from the load sensor 6b is input into the first slave controller 50, and the detection signal from the rotation angle sensor 92 is input into the first slave controller 50 and the first master controller 30 via the drivers 62 and 63. The detection signal from the load sensor 6d is input into the second slave controller 51 and the detection signal from the rotation angle sensor 95 is input into the second slave controller 51 via the driver 65.

According to the vehicle brake system 1c of Modified Example 3, redundancy of the electric brake of the front wheel can be achieved at a low cost.

5. Modified Example 4

Figure 9:
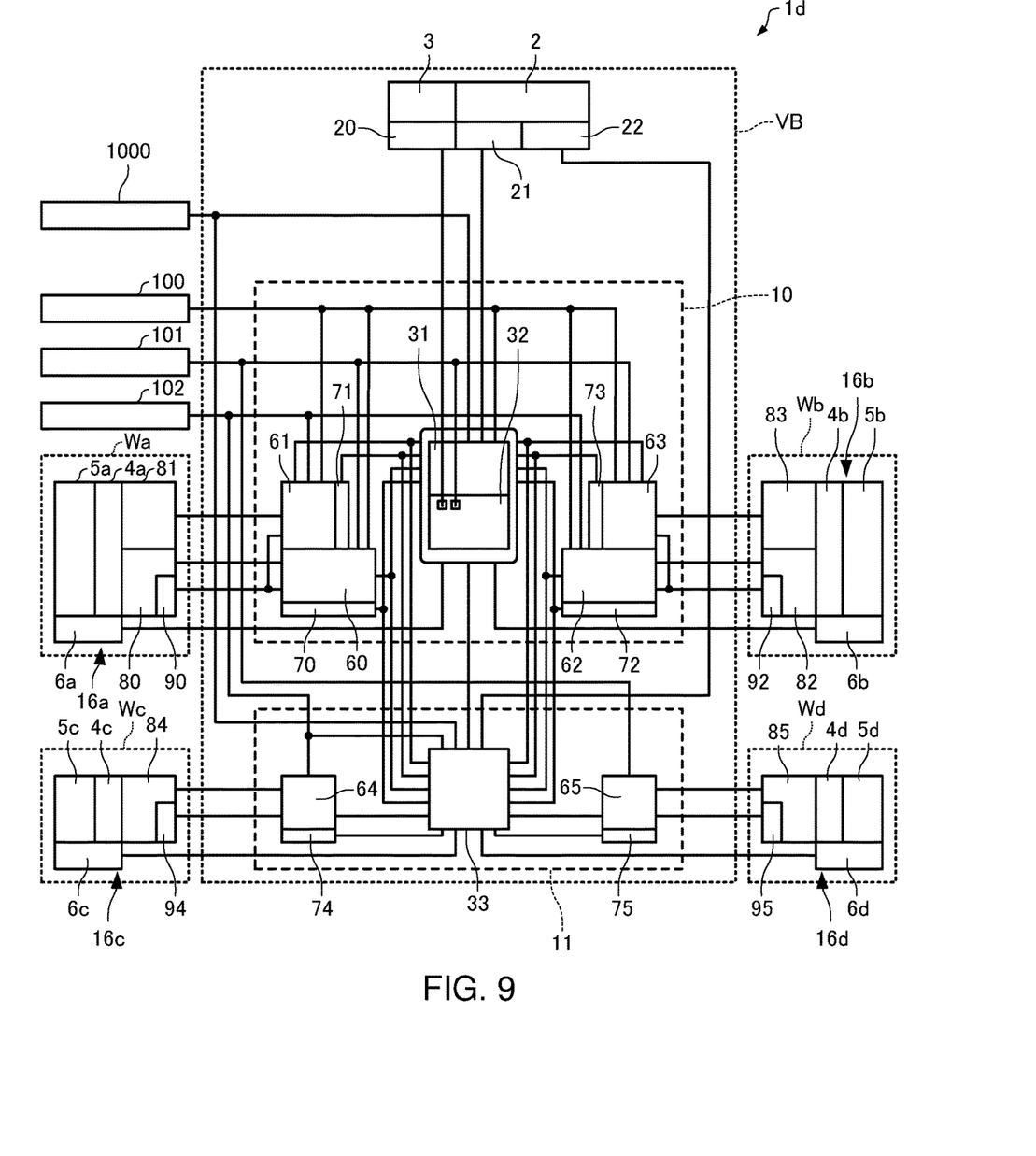
FIG. 9 is an overall configuration diagram illustrating a vehicle brake system according to Modified Example 4.
Figure 10:
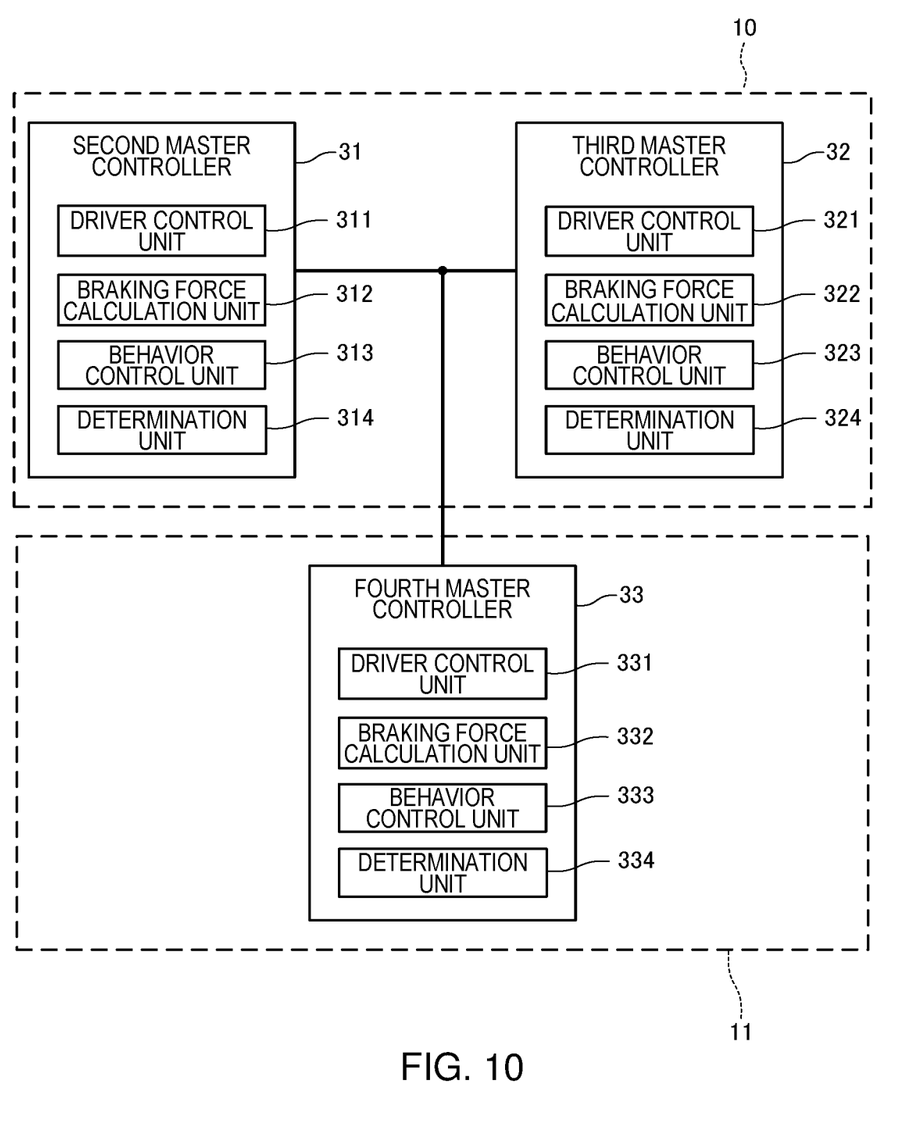
FIG. 10 is a block diagram illustrating a second master controller, a third master controller, and a fourth master controller of a vehicle brake system according to Modified Example 4.

A vehicle brake system 1d according to Modified Example 4 will be described with reference to FIGS. 9 and 10. FIG. 9 is an overall configuration diagram illustrating the vehicle brake system 1d according to Modified Example 4. FIG. 10 is a block diagram illustrating a second master controller 31, a third master controller 32, and a fourth master controller 33 of the vehicle brake system 1d according to Modified Example 4. In the following descriptions, the same components as in the vehicle brake system 1 of FIGS. 1 and 2 are denoted by the same reference signs in FIGS. 9 and 10, and detailed descriptions thereof will be omitted.

As illustrated in FIGS. 9 and 10, in the vehicle brake system 1d, a control device includes a first control device 10 and a second control device 11.

The first control device 10 includes the second master controller 31, the third master controller 32, drivers 60 and 61 that drive the motors 80 and 81 of the electric brake 16a, drivers 62 and 63 that drive the motors 82 and 83 of the electric brake 16b, and current sensors 70 to 73.

The second control device 11 includes the fourth master controller 33, a driver 64 that drives the motor 84 of the electric brake 16c, a driver 65 that drives the motor 85 of the electric brake 16d, and current sensors 74 and 75.

The second to fourth master controllers 31 to 33 are microcomputers. The second master controller 31 includes a driver control unit 311, a braking force calculation unit 312, a behavior control unit 313, and a determination unit 314 that are similarly configured as in the first master controller 30. The third master controller 32 includes a driver control unit 321, a braking force calculation unit 322, a behavior control unit 323, and a determination unit 324 that are similarly configured as in the first master controller 30. The fourth master controller 33 includes a driver control unit 331, a braking force calculation unit 332, a behavior control unit 333, and a determination unit 334 that are similarly configured as in the first master controller 30. The driver control units 311 and 321 each can control the drivers 60 to 63, and the driver control unit 331 can control the drivers 60 to 65. Note that the detection signals from the load sensors 6a and 6b are input into the second and third master controllers 31 and 32, the detection signal from the rotation angle sensor 90 is input into the second and third master controllers 31 and 32 via the drivers 60 and 61, and the detection signals from the rotation angle sensor 92 are input into the second and third master controllers 31 and 32 via the drivers 62 and 63. The detection signals from the load sensors 6c and 6d are input into the fourth master controller 33, the detection signal from the rotation angle sensor 94 is input into the fourth master controller 33 via the driver 64, and the detection signal from the rotation angle sensor 95 is input into the fourth master controller 33 via the driver 65. Further, the detection signal from the first stroke sensor 20 is input into the third master controller 32, the detection signal from the second stroke sensor 21 is input into the second master controller 31, and the detection signal from the third stroke sensor 22 is input into the fourth master controller 33.

According to the vehicle brake system 1d of Modified Example 4, each of the second to fourth master controllers 31 to 33 can control the drivers 60 and 61 corresponding to the two motors 80 and 81 of the electric brake 16a and the drivers 62 and 63 corresponding to the two motors 82 and 83 of the electric brake 16b, thus improving redundancy of the electric brake of the front wheel and improving the controllability.

The invention is not limited to the embodiments described above, and various modifications are possible. For example, the invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

REFERENCE SIGNS LIST 1, 1a, 1b, 1c, 1d Vehicle brake system
2 Brake pedal
3 Stroke simulator
4a to 4d Decelerator
5a to 5d Brake caliper
6a to 6d Load sensor
10 First control device
11 Second control device
16a to 16d Electric brake
20 First stroke sensor
21 Second stroke sensor
22 Third stroke sensor
30 First master controller
301 Driver control unit
302 Braking force calculation unit
303 Behavior control unit
304 Determination unit
31 Second master controller
311 Driver control unit
312 Braking force calculation unit
313 Behavior control unit
314 Determination unit
32 Third master controller
321 Driver control unit
322 Braking force calculation unit
323 Behavior control unit
324 Determination unit
33 Fourth master controller
331 Driver control unit
332 Braking force calculation unit
333 Behavior control unit
334 Determination unit
40 First sub-controller
400 Driver control unit
402 Braking force calculation unit
404 Determination unit
41 Second sub-controller
410 Driver control unit
412 Braking force calculation unit
414 Determination unit
42 Third sub-controller
420 Driver control unit
422 Braking force calculation unit
424 Determination unit
43 Fourth sub-controller
430 Driver control unit
432 Braking force calculation unit
434 Determination unit
44 Fifth sub-controller
440 Driver control unit
442 Braking force calculation unit
444 Determination unit
50 First slave controller
500 Driver control unit
51 Second slave controller
510 Driver control unit
60 to 65 Driver
70 to 75 Current sensor
80 to 85 Motor
90, 92, 94, 95 Rotation angle sensor
100 to 102 Battery
1000 Other control devices
VB Vehicle
Wa to Wd Wheel

The invention claimed is:

1. A vehicle brake system comprising:
an electric brake including a first electric actuator and a second electric actuator that presses a friction pad toward a rotor side;
a plurality of drivers that drives the first electric actuator and the second electric actuator; and
a first control device that controls the plurality of drivers, each of the plurality of drivers corresponding to one of the first electric actuator and the second electric actuator, wherein
the first control device includes a first controller and a second controller,
the first controller controls a driver corresponding to one of the first and second electric actuators, and the second controller controls a driver corresponding to the other of the first and second electric actuators,
the first controller includes:
a first driver control unit; and
a first braking force calculation unit, the second controller includes:
   a second driver control unit; and
   a second braking force calculation unit, and
the vehicle brake system further comprising a behavior control unit provided only in the first controller, the behavior control unit configured to control a behavior of a vehicle by controlling the first driver control unit and the second driver control unit.

2. The vehicle brake system according to claim 1, further comprising:
   a second control device including a third controller.

3. The vehicle brake system according to claim 1, wherein output signals from the plurality of electric actuators are input into the first controller and the second controller.

4. The vehicle brake system according to claim 1, wherein the electric brake including the plurality of electric actuators is provided to a front wheel.

5. The vehicle brake system according to claim 2, wherein the third controller includes:
   a third driver control unit; and
   a third braking force calculation unit.

6. The vehicle brake system according to claim 5, wherein the first controller further includes a first determination unit;
the second controller further includes a second determination unit; and
the third controller further includes a third determination unit,
wherein the first determination unit, the second determination unit, and the third determination unit compare calculation results from the first braking force calculation unit, the second braking force calculation unit, and the third braking force calculation unit, and determine a braking force using a majority decision.

7. A vehicle brake system comprising:
an electric brake including a first electric actuator and a second electric actuator that presses a friction pad toward a rotor side;
a first driver that drives the first electric actuator, and a second driver that drives the second electric actuator;
a first control device that controls the first driver,
a second control device, provided separately from the first control device, that controls the second driver, wherein
the first control device includes a first controller, and the second control device includes a second controller,
the first controller includes:
   a first driver control unit; and
   a first braking force calculation unit, and
the second controller includes:
   a second driver control unit; and
   a second braking force calculation unit, and
the vehicle brake system further comprising a behavior control unit provided only in the first controller, the behavior control unit configured to control a behavior of the a vehicle by controlling the first driver control unit and the second driver control unit.

* * * * *